United States Patent
Ghosh et al.

(10) Patent No.: US 11,600,088 B2
(45) Date of Patent: Mar. 7, 2023

(54) UTILIZING MACHINE LEARNING AND IMAGE FILTERING TECHNIQUES TO DETECT AND ANALYZE HANDWRITTEN TEXT

(71) Applicant: Accenture Global Solutions Limited, Dublin (IE)

(72) Inventors: Debasmita Ghosh, Kolkata (IN); Dharmendra Shivnath Prasad Chaurasia, Mumbai (IN); Siddhanth Gupta, Mumbai (IN); Asmita Mahajan, Himachal Pradesh (IN); Nidhi, New Delhi (IN); Saurav Mondal, Kolkata (IN)

(73) Assignee: Accenture Global Solutions Limited, Dublin (IE)

( * ) Notice: Subject to any disclaimer, the term of this patent is extended or adjusted under 35 U.S.C. 154(b) by 212 days.

(21) Appl. No.: 17/174,101

(22) Filed: Feb. 11, 2021

(65) Prior Publication Data

US 2021/0374455 A1 Dec. 2, 2021

(30) Foreign Application Priority Data

May 29, 2020 (IN) .............................. 202041022602

(51) Int. Cl.
*G06V 30/148* (2022.01)
*G06F 16/953* (2019.01)
(Continued)

(52) U.S. Cl.
CPC .......... *G06V 30/153* (2022.01); *G06F 16/953* (2019.01); *G06N 3/04* (2013.01);
(Continued)

(58) Field of Classification Search
CPC .... G06V 30/36; G06V 30/153; G06V 30/414; G06V 30/2455; G06F 16/953; G06N 3/04
See application file for complete search history.

(56) References Cited

U.S. PATENT DOCUMENTS

| 8,705,836 B2 * | 4/2014 | Gorski | G06V 30/274 382/137 |
|---|---|---|---|
| 2007/0041642 A1 * | 2/2007 | Romanoff | G06V 30/414 382/177 |

(Continued)

*Primary Examiner* — Daniel G Mariam
(74) *Attorney, Agent, or Firm* — Harrity & Harrity, LLP

(57) ABSTRACT

In some implementations, a device may receive an image that depicts handwritten text. The device may determine that a section of the image includes the handwritten text. The device may analyze, using a first image processing technique, the section to identify subsections of the section that include individual words of the handwritten text. The device may reconfigure, using a second image processing technique, the subsections to create preprocessed word images associated with the individual words. The device may analyze, using a word recognition model, the preprocessed word images to generate digitized words that are associated with the preprocessed word images. The device may verify, based on a reference data structure, that the digitized words correspond to recognized words of the word recognition model. The device may generate, based on verifying the digitized words, digital text according to a sequence of the digitized words in the section.

20 Claims, 9 Drawing Sheets

(51) Int. Cl.
  *G06N 3/04*      (2023.01)
  *G06V 30/32*     (2022.01)
  *G06V 30/414*    (2022.01)
  *G06V 30/244*    (2022.01)

(52) U.S. Cl.
  CPC .......... *G06V 30/2455* (2022.01); *G06V 30/36* (2022.01); *G06V 30/414* (2022.01)

(56) References Cited

U.S. PATENT DOCUMENTS

| | | | |
|---|---|---|---|
| 2007/0286486 A1* | 12/2007 | Goldstein | G06V 30/1918 |
| | | | 382/229 |
| 2020/0302208 A1* | 9/2020 | Hoehne | G06V 30/40 |
| 2021/0064860 A1* | 3/2021 | Tuma | G06K 9/6227 |

* cited by examiner

UTILIZING MACHINE LEARNING AND IMAGE FILTERING TECHNIQUES TO DETECT AND ANALYZE HANDWRITTEN TEXT

CROSS-REFERENCE TO RELATED APPLICATION

This Patent application claims priority to India Patent Application No. 202041022602, filed on May 29, 2020, and entitled "UTILIZING MACHINE LEARNING AND IMAGE FILTERING TECHNIQUES TO DETECT AND ANALYZE HANDWRITTEN TEXT." The disclosure of the prior Application is considered part of and is incorporated by reference into this Patent Application.

BACKGROUND

Many businesses are shifting from physical to digital documents. One advantage of this shift is the fast and effective search and knowledge extraction methods available with digital documents. Optical character recognition (OCR) may facilitate converting physical documents into digital documents.

SUMMARY

In some implementations, a method includes receiving, by a device, an image that depicts handwritten text; determining, by the device, that a section of the image includes the handwritten text; analyzing, by the device and using a first image processing technique, the section to identify subsections of the section that include individual words of the handwritten text; reconfiguring, by the device and using a second image processing technique, the subsections to create preprocessed word images associated with the individual words; analyzing, by the device and using a word recognition model, the preprocessed word images to generate digitized words that are associated with the preprocessed word images; verifying, by the device and based on a reference data structure, that the digitized words correspond to recognized words of the word recognition model; generating, by the device and based on verifying the digitized words, digital text according to a sequence of the digitized words in the section; and performing, by the device, an action associated with the digital text.

In some implementations, a device includes one or more memories and one or more processors, communicatively coupled to the one or more memories, configured to: receive an image that depicts handwritten text; determine that a section of the image includes the handwritten text; analyze, using a first image processing technique, the section to identify subsections of the section that include individual words of the handwritten text; reconfigure, using a second image processing technique, the subsections to create preprocessed word images of the individual words; convert, using a word recognition model, the preprocessed word images to digital text that is associated with the preprocessed word images; and store the digital text in a data structure of a data management system.

In some implementations, a non-transitory computer-readable medium storing a set of instructions includes one or more instructions that, when executed by one or more processors of a device, cause the device to: receive an image that depicts handwritten text; determine that a section of the image includes a portion of the handwritten text; analyze the section to identify a subsection of the section that is associated with individual word of the portion of the handwritten text; reconfigure the subsection to create a preprocessed word image of the individual word; convert, using a machine learning model, the preprocessed word image to a digital word that is associated with the preprocessed word image; determine, based on a sequence of subsections of the section, a sequence identifier of the digital word; generate, based on the sequence identifier and the digital word, digital text associated with the image; and perform an action associated with the digital text.

DETAILED DESCRIPTION

Figure 1:
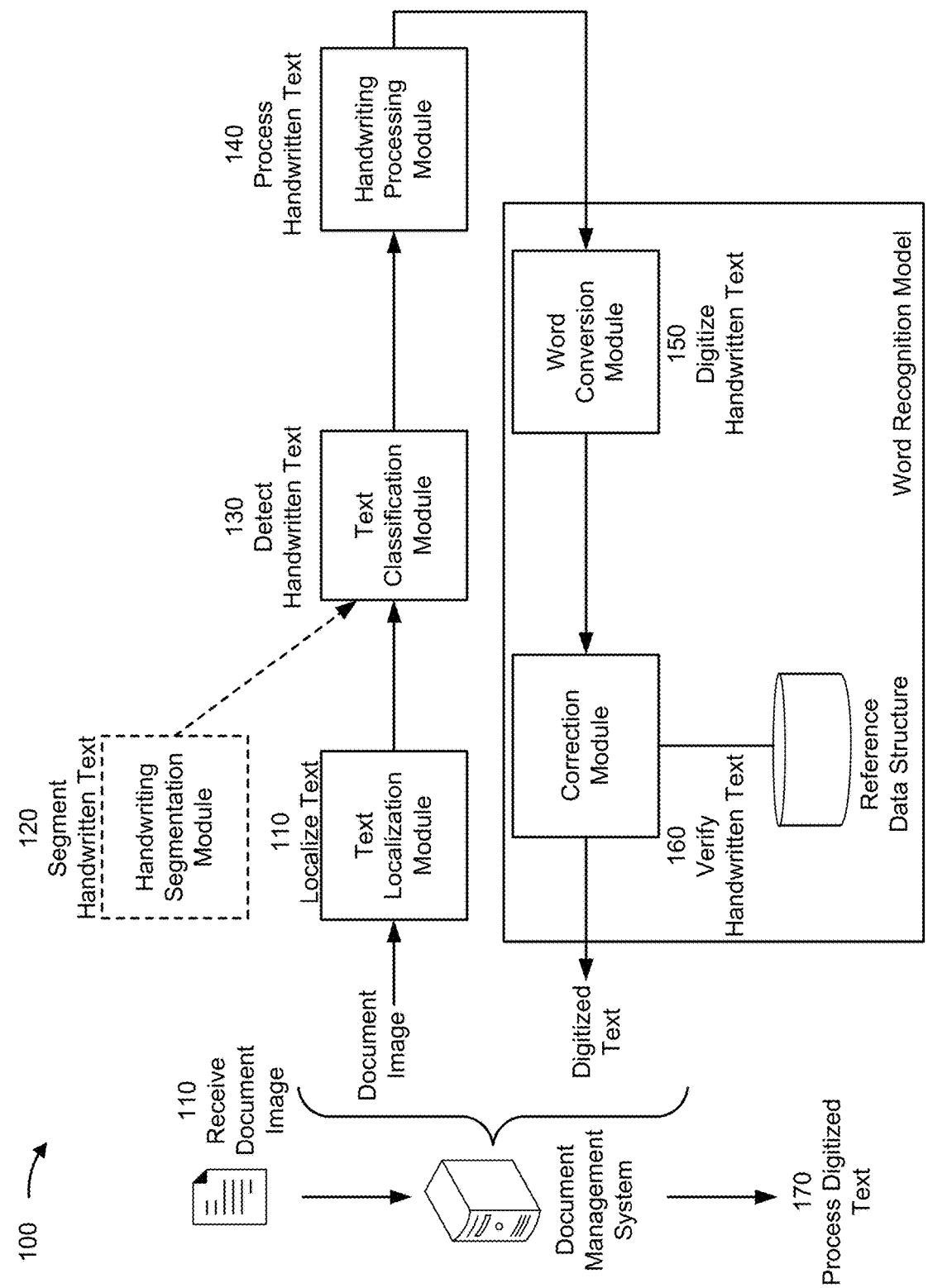
FIGS. 1-5 are diagrams of an example implementation described herein.

The following detailed description of example implementations refers to the accompanying drawings. The same reference numbers in different drawings may identify the same or similar elements.

Current document processing techniques typically require manually copying or extracting information from documents, scanning or copying the documents in an effort to copy or extract the information, and/or converting the information into a digital format. Such document processing techniques are expensive, time consuming, may result in poor customer service (e.g., based on overdue processing, inaccuracies, and/or the like), and/or the like. Further, previous character and/or text recognition techniques are not suitably configured to detect and/or analyze (e.g., recognize, interpret, and/or the like) handwritten information from the documents. More specifically, because individuals inherently develop or have unique writing styles (with varying character sizes, spacing, and/or the like), there can be billions or more ways to write the same word. In combination with the various languages, various types or sets of characters, and/or the like that can be handwritten, previous techniques have relatively low accuracy with respect to detecting or analyzing handwritten text within an image, because such techniques are configured to detect and/or analyze preconfigured styles of text. Thus, previous techniques may inaccurately detect and/or analyze handwritten text, resulting in a waste of computing resources (e.g., processing resources, memory resources, communication resources, and/or the like), networking resources, human resources, and/or the like associated with manually processing documents, generating incorrect digital forms of the documents, correcting the incorrect digital forms of the documents if discovered, and/or like. Further, configuring computing resources, network resources, and/or human resources to detect and/or analyze handwritten text may not be feasible due to wide variety of writing styles, which can also individually be changing or evolving.

Some implementations described herein provide a processing platform that utilizes machine learning models and image processing techniques (e.g., filtering techniques, content reconfiguration techniques, and/or the like) to process image-based documents to detect and/or analyze handwritten text. For example, the processing platform may receive an image of a document that includes handwritten text, identify that the document includes the handwritten text, and process the document to detect and analyze the handwritten text. More specifically, the processing platform may apply one or more filtering techniques (e.g., dilation techniques) to the image to segment words of the handwritten text and process the segmented words for a machine learning model that is configured to analyze the processed segmented words. In some implementations, the processing platform may convert the handwritten words to a digital format (e.g., digital text) to perform one or more actions associated with information derived from the handwritten text. Such actions may include storing and/or maintaining the information in a data collection system, performing one or more data analyses involving the information, and/or the like.

In this way, the processing platform utilizes machine learning models and/or image processing techniques to detect and analyze handwritten text in a document. The processing platform may provide an intelligent automation framework that detects, segments, interprets, and manages handwritten words in documents, such as medical documents, application forms, invoices, and/or the like. The processing platform may create a pipeline that permits a user to consume complex information associated with a document or a collection of documents with a short time period (e.g., within seconds or minutes). In this way, the processing platform conserves computing resources, network resources, and/or the like that would otherwise be wasted using previous techniques.

FIGS. 1-5 are diagrams of an example implementation 100 associated with utilizing machine learning and image filtering techniques to detect and analyze handwritten text. As shown in FIGS. 1-5, example implementation 100 includes a document management system that may be implemented on one or more devices (e.g., one or more computing devices such as user devices and/or server devices, among other examples). These devices are described in more detail below in connection with FIG. 7 and FIG. 8.

The document management system may implement an improved optical character recognition (OCR) technique configured to detect and process handwritten text within a document image. As shown by reference number 105, the document management system may receive a document image. The document management system may receive the document image, for example, from an input device (e.g., a scanner, a copy machine, a camera, and/or other imaging device that creates the image based on a physical document or another document image) and/or a computing device (e.g., user device 730 shown in FIG. 7) that creates, receives, or otherwise maintains the document image.

As shown by reference number 110, the document management system may process the document image using a text localization module. The text localization module may localize text within the image. For example, the text localization module may identify a presence of, and a location corresponding to, text within the image. In some implementations, the text localization module may utilize an OCR document text localizer as the text localization module. The OCR document text localizer may localize text within the image by using an OCR process.

The text localization module may include a deep learning model. For example, the text localization module may be based on, or include, an Efficient and Accurate Scene Text Detector (EAST) model that may be trained using a large data set (e.g., approximately 10,000 samples) of handwritten and printed word documents. By incorporating proper loss functions, the text localization module can predict either rotated rectangles or quadrangles for text regions, depending on the application.

The text localization module may, for example, have the same, or similar, architecture as the EAST model and may be trained on standard handwritten text datasets including International Conference on Document Analysis and Recognition (ICDAR) 2013, ICDAR 2015, ICDAR 2019 printed invoices, handwritten IAM datasets, and custom datasets collected from internet and crowd sourcing. To train the model, an online annotation tool may be used to create bounding boxes according to an EAST architecture. The dataset may be divided into train (85%), validation (10%), and test (5%) categories. Table 2 shows an example of a dataset that may be used to train the model.

TABLE 2

| DATASET | Number of Images |
| --- | --- |
| ICDAR 2013 | 462 |
| ICDAR 2015 | 1500 |
| ICDAR 2019 (Printed Invoices) | 1000 |
| IAM | 1539 |
| Custom | 122 |

In some implementations, as shown by reference number 120, an alternative (indicated by dashed lines) approach that may be used for localizing text may include a handwriting segmentation module configured to segment handwritten text. The handwriting segmentation module may apply one or more filtering techniques (e.g., dilation techniques) to the document image to segment words of the handwritten text and process the segmented words for a machine learning model that is configured to analyze the processed words. For example, in some implementations, the handwriting segmentation module may perform a color conversion (e.g., from color to grayscale) and/or a binarization using adaptive thresholding techniques. In some implementations, the handwriting segmentation module may perform a denoising (de-noising) operation using a filter (e.g., a bilateral filter), a dilation operation (e.g., a horizontal dilation), a contour detection operation to identify individual words, and/or a word sequencing operation, among other examples. In this way, for example, the handwriting segmentation module may be configured to facilitate analyzing, using a first image processing technique (e.g., segmentation), a section of the document image that includes the handwritten text to identify subsections of the section that include individual words of the handwritten text. In this manner, the handwriting segmentation module may be configured to localize text.

The localized text may include handwritten text and/or printed text, among other examples. Throughout this document, the term "handwritten text" refers to an image of symbols (e.g., letters, numbers, punctuation marks, and/or mathematical operators, among other examples) and/or groups of symbols (e.g., words, multiple-digit numbers, equations, and/or algebraic expressions, among other examples) that have been physically written by a person onto a physical medium (e.g., a paper document). For example, the document image may include handwritten text that is an image of letters and/or words that is written on the physical document corresponding to the document image. The document image also may depict printed text, images, drawings, and/or markings, among other examples. The document image may be an image corresponding to any type of document that may include handwritten text (e.g., a form, a first information report (FIR), a sticky note).

As shown by reference number 130, the document management system may process the document image using a text classification module. The text classification module may be configured to detect handwritten text within the document image. For example, the text classification module may determine that a section of the document image includes the handwritten text. The classification module may utilize a classifier that is configured to predict bounding boxes (e.g., rotated rectangles or quadrangles) for text regions.

In some implementations, the text classification module may include a convolutional neural network (CNN) classifier configured to segregate between handwritten words and printed words. In some implementations, for example, the CNN classifier may include three hidden layers with a rectified linear unit activation function and a fourth layer with a sigmoid activation function. The CNN classifier may be trained using any number of different data sets selected to configure the classifier for segregating between handwritten text and printed text.

As shown by reference number 140, the document management system may utilize a handwriting processing module to process the segmented handwritten text. In some implementations, for example, the handwriting processing module may be configured to reconfigure, using a second image processing technique (e.g., filtering), the subsections to create preprocessed word images associated with the individual words. Handwritten text may be segmented based on spacing between words and/or letters. For example, the handwriting segmentation module may be trained based on samples of different handwriting in which the authors used different spacings between words and/or within words. In some implementations, as explained in more detail below in connection with FIG. 4, the handwriting processing module may include using various techniques for resizing a word image (an image of a segmented individual word) to an aspect ratio that a word recognition module is trained to receive as input.

As shown, the document management system may provide the processed word images to a word recognition model that is configured to digitize handwritten text. As shown in FIG. 1, the word recognition model may include a word conversion module, a correction module, and a reference data structure. As shown by reference number 150, the document management system may utilize the word conversion module to digitize the handwritten text. In some implementations, as described in more detail below in connection with FIG. 5, the word conversion module may include, or be included in, a word recognition model. The model may include a multi-layered system of neural networks configured recognize a handwritten word and output a digitized word associated with the handwritten word.

As shown by reference number 160, the document management system may utilize a correction module to verify the recognized handwritten text. The correction module may, for example, cross-check the recognized handwritten word with a spell checker and/or a word database to verify the accuracy of the recognition of the model. In some implementations, the correction module may be configured to access information stored in a reference data structure to perform the verification. The reference data structure may store a word database, a spell checker library, a thesaurus, and/or grammatical information for verifying a recognized handwritten word based on context relative to adjacent words, among other examples. The word recognition model may generate, based on verifying the digitized words, digital text according to a sequence of the digitized words in the section.

As shown by reference number 170, the document management system may process the digitized text. For example, the document management system may perform an action associated with the digitized text. Performing the action may include storing and/or maintaining the information in a data collection system and/or performing one or more data analyses involving the information represented by the digitized text, among other examples. The document management system may provide data associated with the digitized text to a data management system (e.g., data management system 740 shown in FIG. 7). For example, the data management system may store the digital text in a data structure associated with a search engine to permit the digital text to be retrieved in association with a search query. The document management system may perform an analysis of the digital text relative to data maintained by the data management system, generate a report based on the analysis of the digital text relative to the data, and/or provide the report to a user device associated with the data management system. In some implementations, the document management system may combine the digitized text with other digitized text and/or graphics associated with the document image to generate a digitized document that corresponds to the document image. In this way, aspects of implementations described herein may facilitate creating a pipeline that permits a user to consume complex information associated with a document or a collection of documents within a short time period (e.g., within seconds or minutes).

Figure 2:
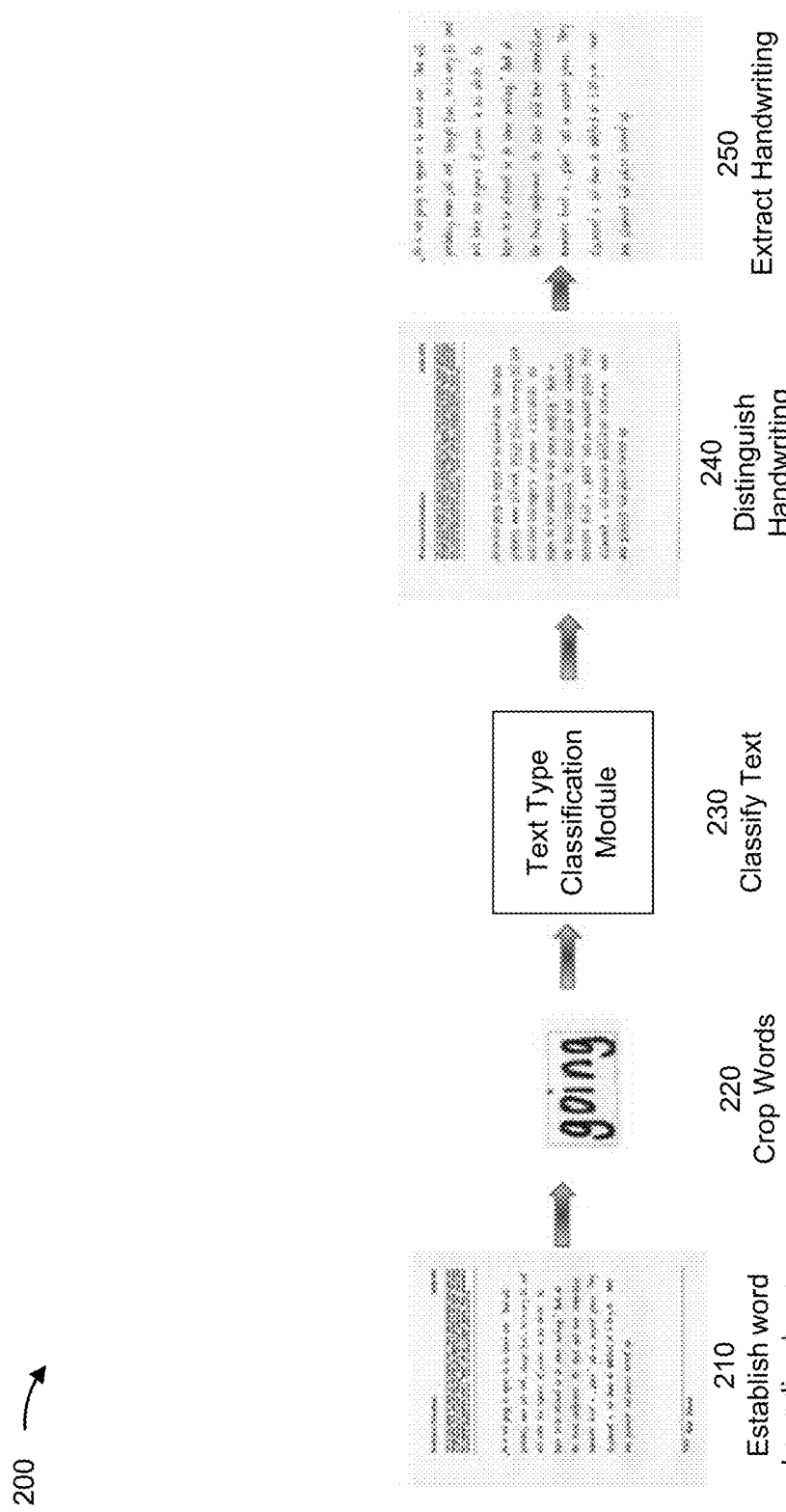

FIG. 2 depicts an illustrative operation 200 of the text classification module shown in FIG. 1. As shown by reference number 210, the text classification module may establish word bounding boxes based on detecting handwritten text in a document image. For example, the text classification module may use text detection, object detection, and/or standard OCR techniques to establish bounding boxes. As shown by reference number 220, the text classification module may crop words based on the bounding boxes. The cropping operation may be used to produce word boxes that contain one or two words, for example.

As shown by reference number 230, a text type classification module may classify text using a neural network or a system of neural networks. The text type classification module may be configured to distinguish between handwritten text and digital text. As shown by reference number 240, the text classification module may distinguish between handwritten text and digital text. For example, a word level deep learning CNN (e.g., with three layers) and a set of fully connected layers (e.g., three layers) trained to distinguish between handwritten text and printed text (e.g., printed by a machine) may be used to classify text. The neural network may be trained to distinguish between printed text and handwritten text based on historical images that include historical configurations of printed text and historical configurations of handwritten text. As shown by reference number 250, the text classification module may extract the handwriting based on identifying, based on a classification by the neural network, that the section includes the handwritten text.

Figure 3:
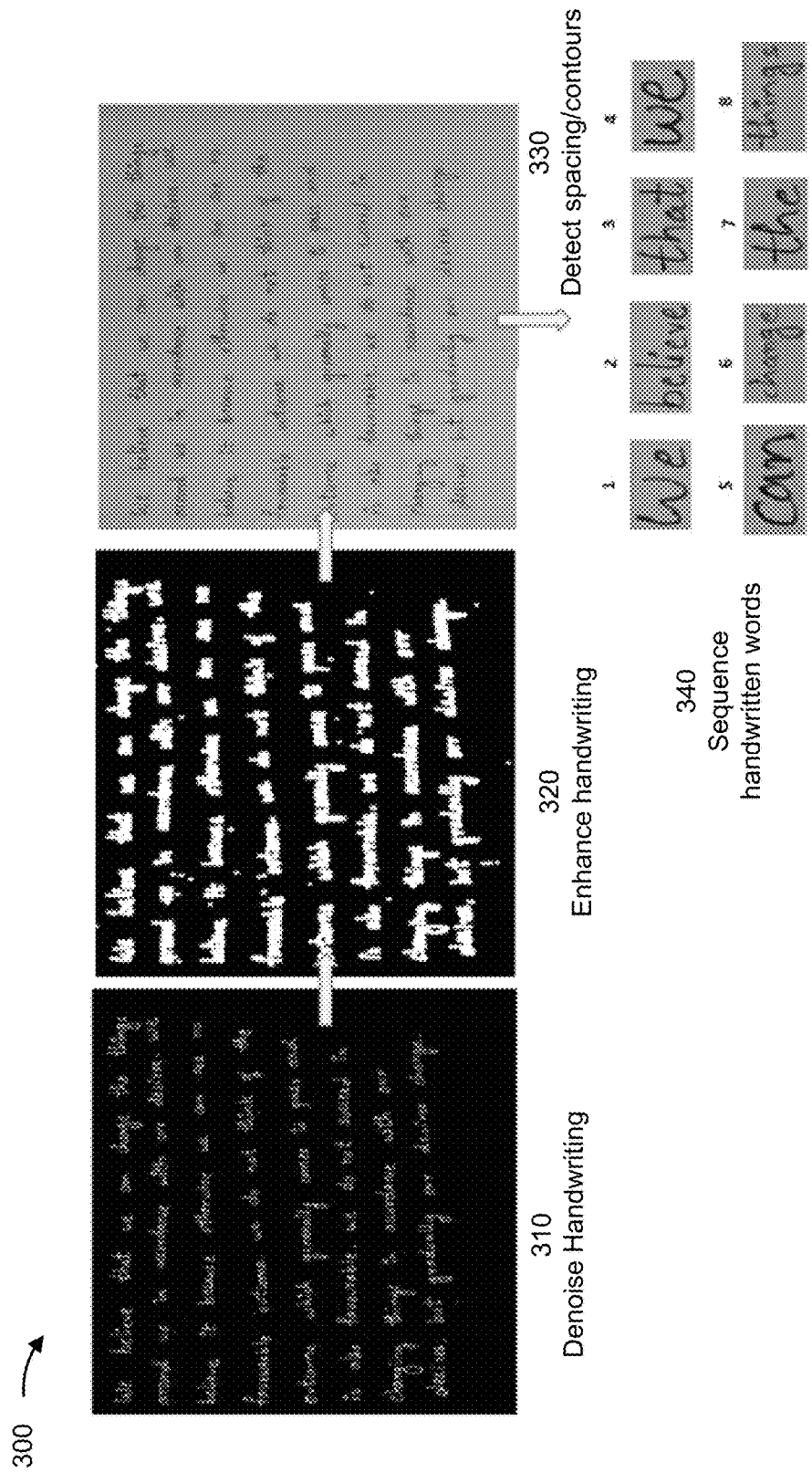

FIG. 3 depicts illustrative operations 300 of the handwriting segmentation module shown in FIG. 1. For example, in some implementations, a normalizing technique may be used to form normalized subsections, from the subsections, based at least in part on one or more sizes of the subsections. For example, the normalizing technique may involve resizing subsections and/or adjusting aspect ratios according to a longest length of text and/or spacing between words. A binary filtering technique may be used to denoise the normalized subsections to form denoised subsections, and a dilation technique may be used to enhance the denoised subsections to form enhanced subsections. Preprocessed word images may be created from corresponding content of the enhanced subsections. The content may include, for example, pixels having values representative of handwritten text.

As shown by reference number 310, in some implementations, the handwriting segmentation module may denoise the handwriting. For example, in some implementations, the handwriting segmentation module may apply a binary filtering technique to denoise a section of the document image determined to contain handwriting to form a denoised section. As shown by reference number 320, the denoised section may be enhanced. For example, a dilation technique may be used to enhance the denoised section to form an enhanced section. The dilation technique may include horizontal dilation.

As shown by reference number 330, a segmentation technique may be used to identify subsections of the section according to a plurality of bounding boxes. Individual words may be identified within corresponding individual bounding boxes of the plurality of bounding boxes. Segmentation may be performed based at least in part on detecting spacing between letters and/or words, and/or detecting contours of letters and/or words, among other examples. As shown by reference number 340, the handwriting segmentation module may utilize a sequencing technique to determine the sequence of the digitized words according to an arrangement of the bounding boxes in the section. The bounding boxes may define subsections of sections of the document image. The subsections, in the case of implementations related to letters and words, may be referred to as word images, as they are (or at least often are) images of words.

Figure 4:
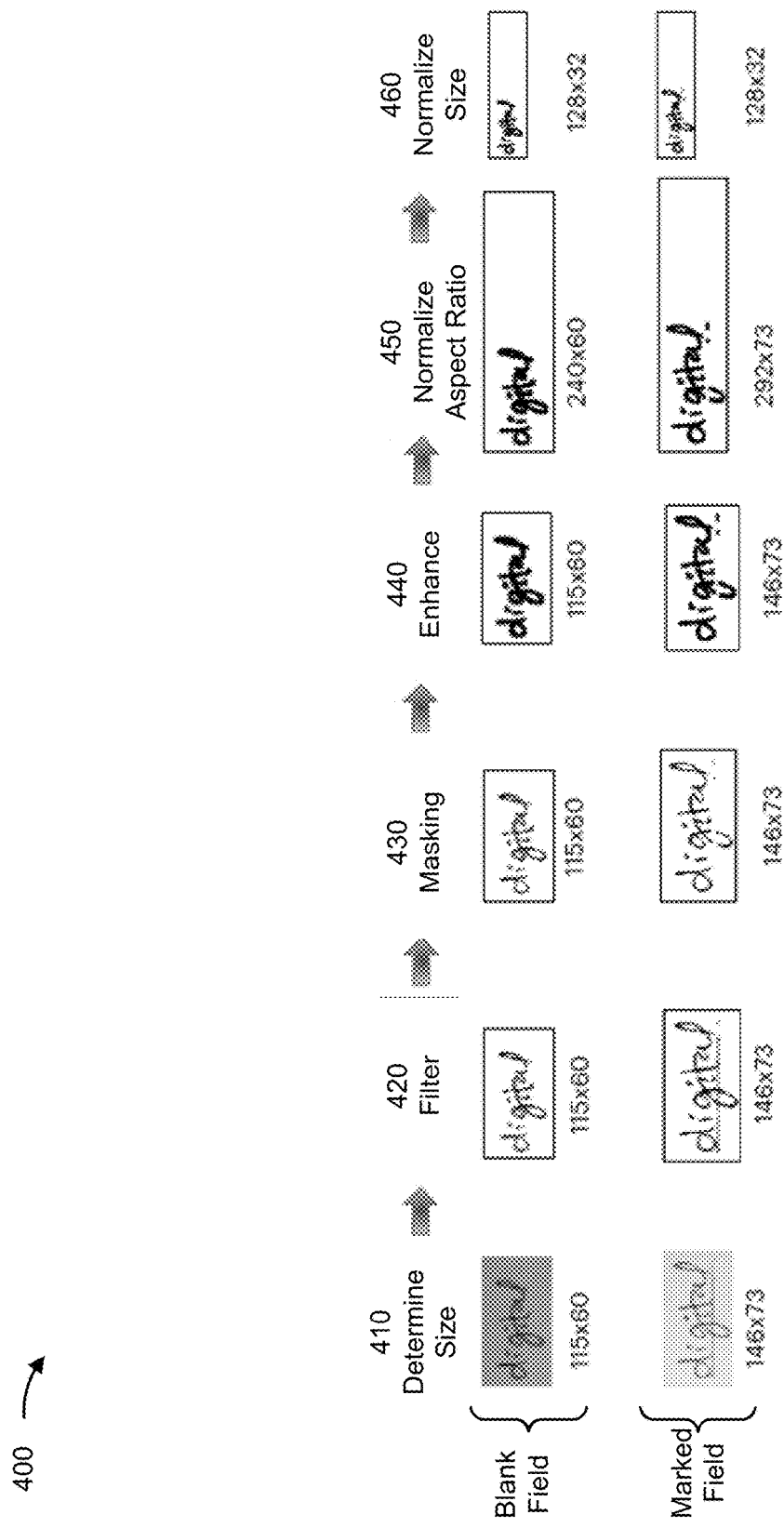

FIG. 4 depicts an illustrative operation 400 of the handwriting processing module shown in FIG. 1. The handwriting processing module may perform processing (which may also be referred to as "pre-processing") on subsections of sections of the document image. The processing may use one or more imaging techniques. The processing performed by the handwriting processing module may be used to improve word image uniformity, which may enhance the overall accuracy of the word recognition model.

As shown by reference number 410, the handwriting processing module may determine the size of the subsection. As shown by reference number 420, the handwriting processing module may filter the subsections utilizing an adaptive thresholding technique. In some implementations, for example, adaptive thresholding binarization may be used to automatically perform clustering-based image thresholding to reduce a gray level image to a binary image. In some aspects, the adaptive thresholding technique may classify the pixels of the subsection into two classes based on a bi-modal histogram (e.g., foreground pixels and background pixels). An optimum threshold separating the two classes may be calculated based on a specified error measure. In this manner, the adaptive thresholding technique may be used to convert gray-scale images to binary (e.g., black and white) images, which may facilitate further processing.

As shown by reference number 430, the handwriting processing module may perform a masking technique to remove non-text indicators from the enhanced subsections to form masked subsections. Non-text indicators may include horizontal lines (e.g., where a portion of handwritten text was underlined), brackets, asterisks, and/or any other type of non-text marking. The preprocessed word images may be created from corresponding masked content of the masked subsections.

As shown by reference number 440, the handwriting processing module may perform an enhancement technique to improve broken characters. For example, in some aspects, an erosion technique may be performed using a kernel size of 3×3 with two or more iterations. In some implementations, erosion may be used to add pixel values at broken character locations. Pixels near a boundary may be discarded, depending on the size of the kernel. As a result, the enhancement technique may decrease the thickness of the foreground object or a white region. Aspects of this technique also may be used for removing small white noise and/or attaching two disconnected objects, among other examples.

As shown by reference number 450, the handwriting processing module may perform a normalizing technique to normalize an aspect ratio of a word image. The subsections (e.g., word crops or word images) may be created of varied size as different words will have different widths and heights. For instance, an image of the word "error" may have a lower width than an image of the word "congratulations" because of the lengths of the words. Similarly, image heights may differ among images due to the heights of the respective characters. Thus, maintaining an aspect ratio may facilitate more effective processing by the word recognition model. For example, in some implementations, the word recognition model may be configured to analyze images of a certain size, in which case, the handwriting processing module may be configured to maintain a corresponding aspect ratio with regard to the subsections. For example, the word recognition model may be configured to take, as input, word images of 128×32 pixels. In that case, the handwriting processing module may be configured to maintain an aspect ratio of 4:1 for subsections.

In some implementations, offset padding may be used to maintain the aspect ratio. For example, the handwriting processing module may utilize offset padding on both sides of the subsection. In some implementations, the padding size may be determined by calculating a current ratio of height and width. For an aspect ratio of 4:1, if the height is less than four times the width, then the height may be padded equally on both left and right sides. If the width is less than one fourth of the height, then the width may be padded equally on both top and bottom. In some implementations, the handwriting processing module may utilize offset padding on the right side of the subsection. The padding area color is determined by the background color of the image.

As shown by reference number 460, word image with the normalized aspect ratio may be normalized in size. To normalize the size, the word image may be resized to a "normal" size (e.g., a size that is expected for processing). For example, as indicated above, the word recognition model may be configured to take, as input, word images of 128×32 pixels, in which case the word image may be resized to 128×32 pixels.

Figure 5:
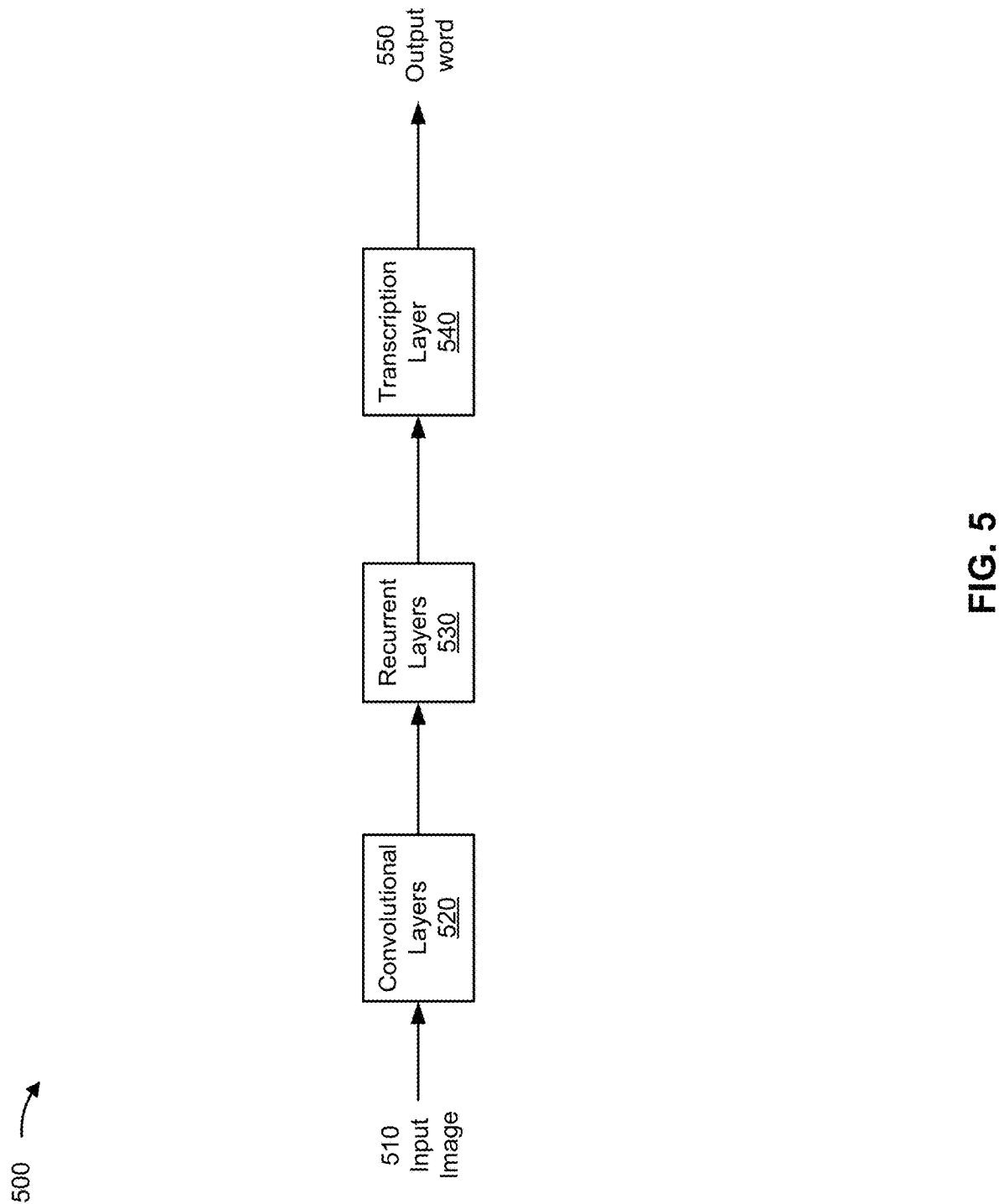

FIG. 5 depicts an illustrative operation 500 of the word conversion module shown in FIG. 1. As shown by reference number 510, an input image is provided to the module. The input image may be the preprocessed image, as described above. As shown by reference number 520, the word conversion module may utilize convolutional layers (e.g., a CNN model) to extract handwritten word features. In some implementations, for example, the convolutional layers may include 5 layers. The preprocessed image may be fed into the first layer. The layers may be trained to extract relevant features from the image. Each layer may include one or more operations. For example, in some implementations, each layer may include three operations. First, the convolution operation may be applied. Then, a non-linear rectified linear unit (RELU) function may be applied. Next, a pooling layer may summarize image regions and output a feature map (or sequence). The feature map or sequence may include a size that is based at least in part on the configuration of the model. For example, in some implementations, the feature map may have a size of 32×256.

As shown by reference number 530, the word conversion module may utilize a recurrent layers (e.g., a recurrent neural network (RNN) model) to recognize the word corresponding to the preprocessed image. The recurrent layers may include any number of different layers. For example, in some implementations, the recurrent layers may include 2 long short-term memory (LSTM) layers. Each layer may include, for example, 256 units that propagate information through the sequence. LSTM implementation of RNNs may be used due to the ability of LSTM implementations to propagate information through longer distances and provide robust training characteristics. In some implementations, the RNN output sequence may be mapped to a matrix (e.g., a 32×80 matrix). Each matrix element may represent a score for one of the 80 characters at one of the 32 time-steps. As shown by reference number 540, a transcription layer may be configured to provide the output of the model, which is the recognized word, shown by reference number 550.

As indicated above, FIGS. 1-5 are provided as an example. Other examples may differ from what is described with regard to FIGS. 1-5. The number and arrangement of devices shown in FIGS. 1-5 are provided as an example. In practice, there may be additional devices, fewer devices, different devices, or differently arranged devices than those shown in FIGS. 1-5. Furthermore, two or more devices shown in FIGS. 1-5 may be implemented within a single device, or a single device shown in FIGS. 1-5 may be implemented as multiple, distributed devices. Additionally, or alternatively, a set of devices (e.g., one or more devices) shown in FIGS. 1-5 may perform one or more functions described as being performed by another set of devices shown in FIGS. 1-5.

Figure 6:
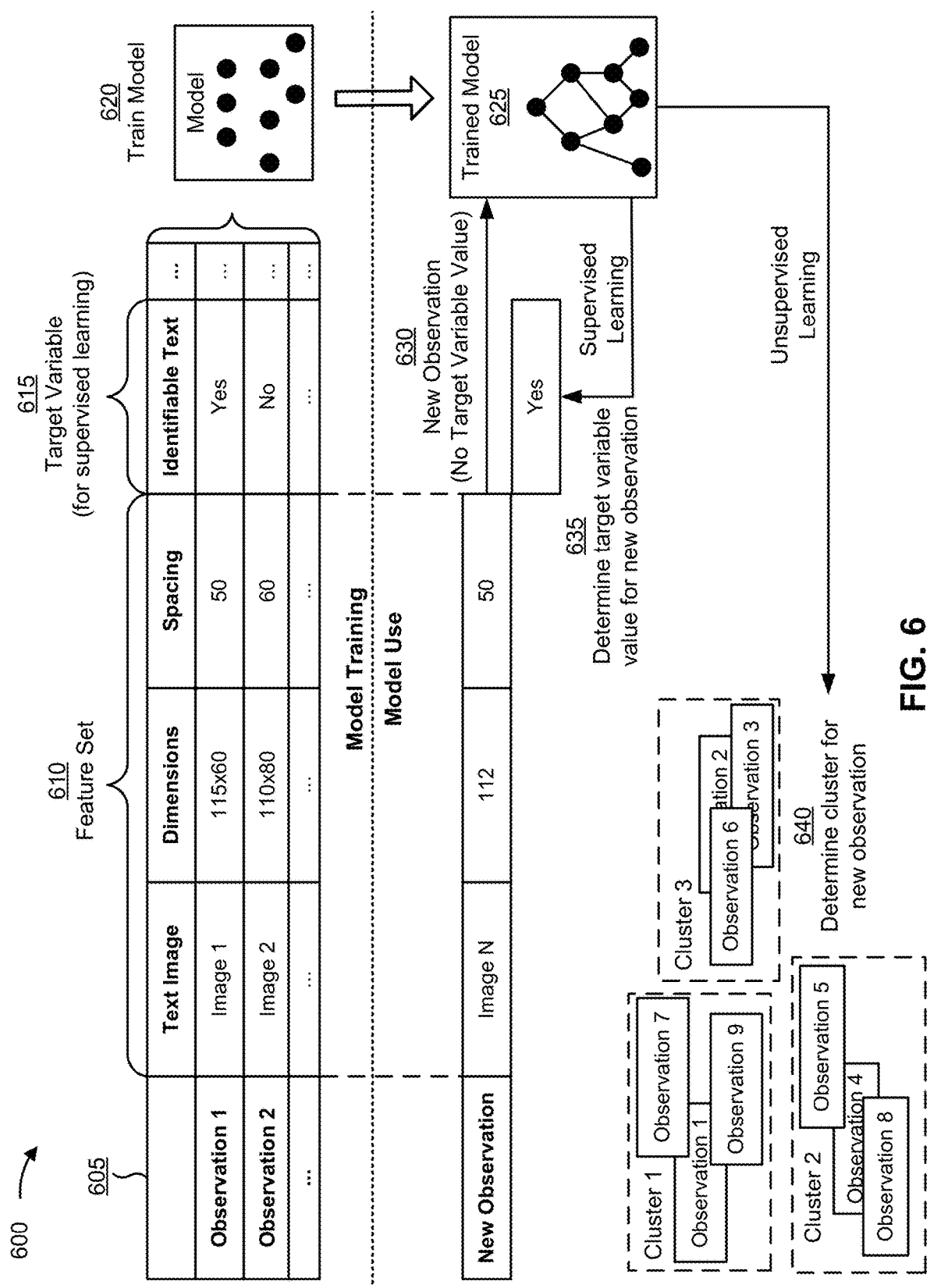
FIG. 6 is a diagram of an example machine learning process described herein.

FIG. 6 is a diagram illustrating an example 600 of training and using a machine learning model in connection with utilizing machine learning and image filtering techniques to detect and analyze handwritten text. The machine learning model training and usage described herein may be performed using a machine learning system. The machine learning system may include or may be included in a computing device, a server, a cloud computing environment, or the like, such as the document management system, the data management system, and/or the user device described in more detail elsewhere herein.

As shown by reference number 605, a machine learning model may be trained using a set of observations. The set of observations may be obtained from training data (e.g., historical data), such as data gathered during one or more processes described herein. In some implementations, the machine learning system may receive the set of observations (e.g., as input) from a data management system, as described elsewhere herein.

As shown by reference number 610, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the data management system. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of a text image, a second feature of dimensions of the image, a third feature of spacing (e.g., empty space around a word or relative to adjacent words (in pixels)), and so on. The observations may be associated with individually identified handwritten words within a document. As shown, for a first observation, the first feature may have a value of "Image 1," the second feature may have a value of 115×60, the third feature may have a value of 50, and so on. These features and feature values are provided as examples, and may differ in other examples. For example, the feature set may include one or more of the following features: pixel value, pixel intensity, slant of the letters, shape of the handwritten text (e.g., overall shape, protrusions, cavities), number of letters, capitalized letters (e.g., larger letters at a beginning of a word), and/or punctuation, among other examples.

As shown by reference number 615, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 600, the target variable is identifiable text, which has a value of "yes" for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 620, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 625 to be used to analyze new observations.

As shown by reference number 630, the machine learning system may apply the trained machine learning model 625 to a new observation, such as by receiving a new observation and inputting the new observation to the trained machine learning model 625. As shown, the new observation may include a first feature value of "Image N", a second feature value of 112, a third feature of 50, and so on, as an example. The machine learning system may apply the trained machine learning model 625 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 625 may predict a value of "yes" for the target variable of identifiable text for the new observation, as shown by reference number 635. Based on this prediction, the machine learning system may provide output for determination of a first recommendation, may perform a first automated action, and/or may cause a first automated action to be performed (e.g., by instructing another device to perform the automated action), among other examples. The first automated action may include, for example, constructing a digital document corresponding to the document that was originally imaged.

In some implementations, the trained machine learning model 625 may classify (e.g., cluster) the new observation in a cluster, as shown by reference number 640. The observations within a cluster may have a threshold degree of similarity. As an example, if the machine learning system classifies the new observation in a first cluster (e.g., Cluster 1), then the machine learning system may classify the image as a word (e.g., as opposed to a letter, punctuation mark. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., Cluster 2), then the machine learning system may provide a second (e.g., different) classification (e.g., letter) and/or may perform or cause performance of a second (e.g., different) automated action, such as associate the letter with an immediately following word.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In this way, the machine learning system may apply a rigorous and automated process to recognize and digitize handwritten text. The machine learning system enables recognition and/or identification of tens, hundreds, thousands, or millions of features and/or feature values for tens, hundreds, thousands, or millions of observations, thereby increasing accuracy and consistency and reducing delay associated with digitizing handwritten text relative to requiring computing resources to be allocated for tens, hundreds, or thousands of operators to manually digitize handwritten test using the features or feature values.

As indicated above, FIG. 6 is provided as an example. Other examples may differ from what is described in connection with FIG. 6.

Figure 7:
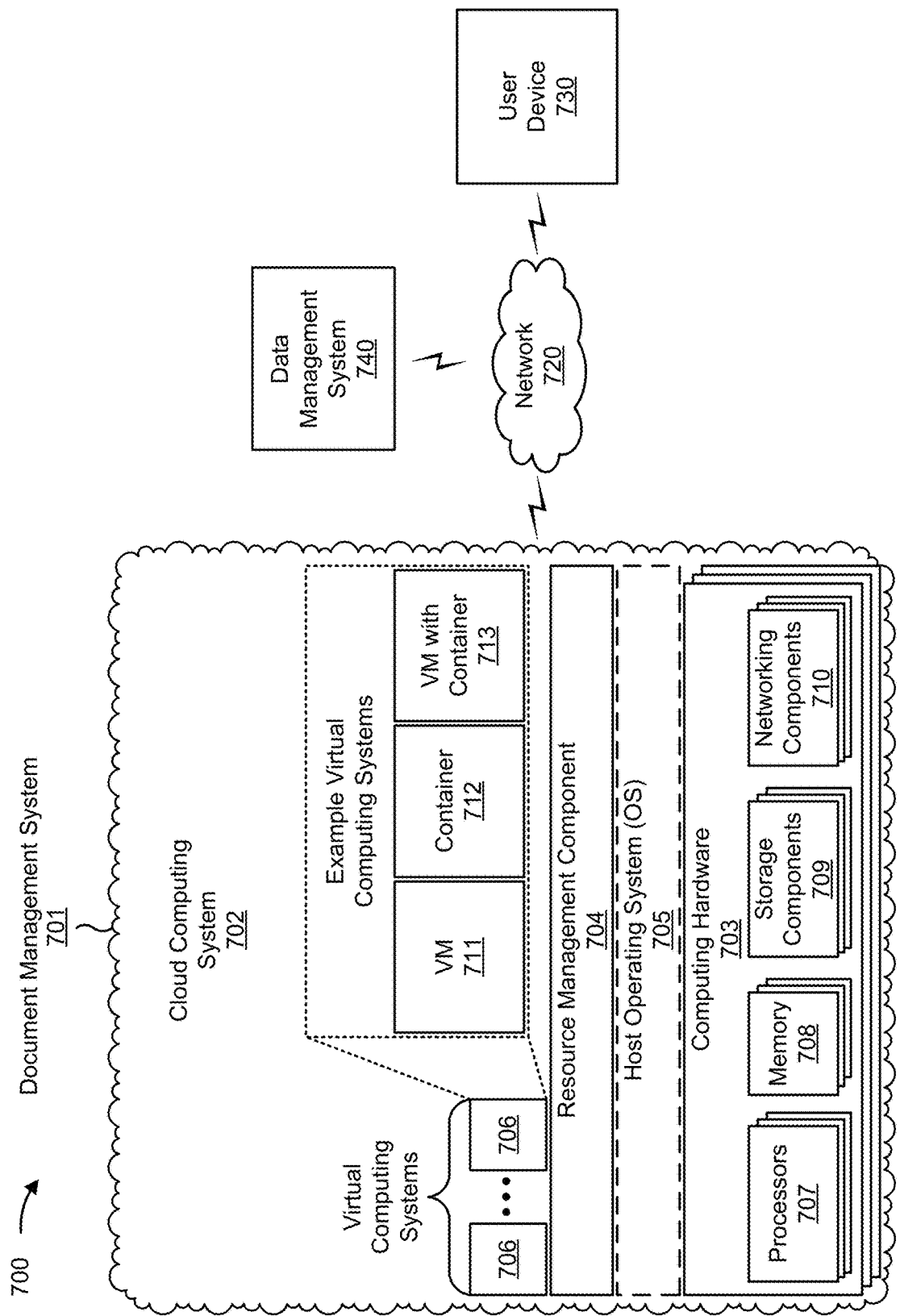
FIG. 7 is a diagram of an example environment in which systems and/or methods described herein may be implemented.

FIG. 7 is a diagram of an example environment 700 in which systems and/or methods described herein may be implemented. As shown in FIG. 7, environment 700 may include a document management system 701, which may include one or more elements of and/or may execute within a cloud computing system 702. The cloud computing system 702 may include one or more elements 703-713, as described in more detail below. As further shown in FIG. 7, environment 700 may include a network 720, a user device 730, and/or a data management system 740. Devices and/or elements of environment 700 may interconnect via wired connections and/or wireless connections.

The cloud computing system 702 includes computing hardware 703, a resource management component 704, a host operating system (OS) 705, and/or one or more virtual computing systems 706. The resource management component 704 may perform virtualization (e.g., abstraction) of computing hardware 703 to create the one or more virtual computing systems 706. Using virtualization, the resource management component 704 enables a single computing device (e.g., a computer, a server, and/or the like) to operate like multiple computing devices, such as by creating multiple isolated virtual computing systems 706 from computing hardware 703 of the single computing device. In this way, computing hardware 703 can operate more efficiently, with lower power consumption, higher reliability, higher availability, higher utilization, greater flexibility, and lower cost than using separate computing devices.

Computing hardware 703 includes hardware and corresponding resources from one or more computing devices. For example, computing hardware 703 may include hardware from a single computing device (e.g., a single server) or from multiple computing devices (e.g., multiple servers), such as multiple computing devices in one or more data centers. As shown, computing hardware 703 may include one or more processors 707, one or more memories 708, one or more storage components 709, and/or one or more networking components 710. Examples of a processor, a memory, a storage component, and a networking component (e.g., a communication component) are described elsewhere herein.

The resource management component 704 includes a virtualization application (e.g., executing on hardware, such as computing hardware 703) capable of virtualizing computing hardware 703 to start, stop, and/or manage one or more virtual computing systems 706. For example, the resource management component 704 may include a hypervisor (e.g., a bare-metal or Type 1 hypervisor, a hosted or Type 2 hypervisor, and/or the like) or a virtual machine monitor, such as when the virtual computing systems 706 are virtual machines 711. Additionally, or alternatively, the resource management component 704 may include a container manager, such as when the virtual computing systems 706 are containers 712. In some implementations, the resource management component 704 executes within and/or in coordination with a host operating system 705.

A virtual computing system 706 includes a virtual environment that enables cloud-based execution of operations and/or processes described herein using computing hardware 703. As shown, a virtual computing system 706 may include a virtual machine 711, a container 712, a hybrid environment 713 that includes a virtual machine and a container, and/or the like. A virtual computing system 706 may execute one or more applications using a file system that includes binary files, software libraries, and/or other resources required to execute applications on a guest operating system (e.g., within the virtual computing system 706) or the host operating system 705.

Although the document management system 701 may include one or more elements 703-713 of the cloud computing system 702, may execute within the cloud computing system 702, and/or may be hosted within the cloud computing system 702, in some implementations, the document management system 701 may not be cloud-based (e.g., may be implemented outside of a cloud computing system) or may be partially cloud-based. For example, the document management system 701 may include one or more devices that are not part of the cloud computing system 702, such as device 800 of FIG. 8, which may include a standalone server or another type of computing device. The document management system 701 may perform one or more operations and/or processes described in more detail elsewhere herein.

Network 720 includes one or more wired and/or wireless networks. For example, network 720 may include a cellular network, a public land mobile network (PLMN), a local area network (LAN), a wide area network (WAN), a private network, the Internet, and/or the like, and/or a combination of these or other types of networks. The network 720 enables communication among the devices of environment 700.

The user device 730 includes one or more devices capable of receiving, generating, storing, processing, and/or providing information described herein. The user device 730 may include a communication device and/or a computing device. For example, the user device 730 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. The user device 730 may communicate with one or more other devices of environment 700, as described elsewhere herein.

The data management system 740 includes one or more devices capable of receiving, generating, storing, processing, providing, and/or routing information described herein. The data management system 740 may include a communication device and/or a computing device. For example, the data management system 740 may include a server, an application server, a client server, a web server, a database server, a host server, a proxy server, a virtual server (e.g., executing on computing hardware), a server in a cloud computing system, a device that includes computing hardware used in a cloud computing environment, or a similar type of device. The data management system 740 may communicate with one or more other devices of environment 700, as described elsewhere herein.

The number and arrangement of devices and networks shown in FIG. 7 are provided as an example. In practice, there may be additional devices and/or networks, fewer devices and/or networks, different devices and/or networks, or differently arranged devices and/or networks than those shown in FIG. 7. Furthermore, two or more devices shown in FIG. 7 may be implemented within a single device, or a single device shown in FIG. 7 may be implemented as multiple, distributed devices. Additionally, or alternatively, a set of devices (e.g., one or more devices) of environment 700 may perform one or more functions described as being performed by another set of devices of environment 700.

Figure 8:
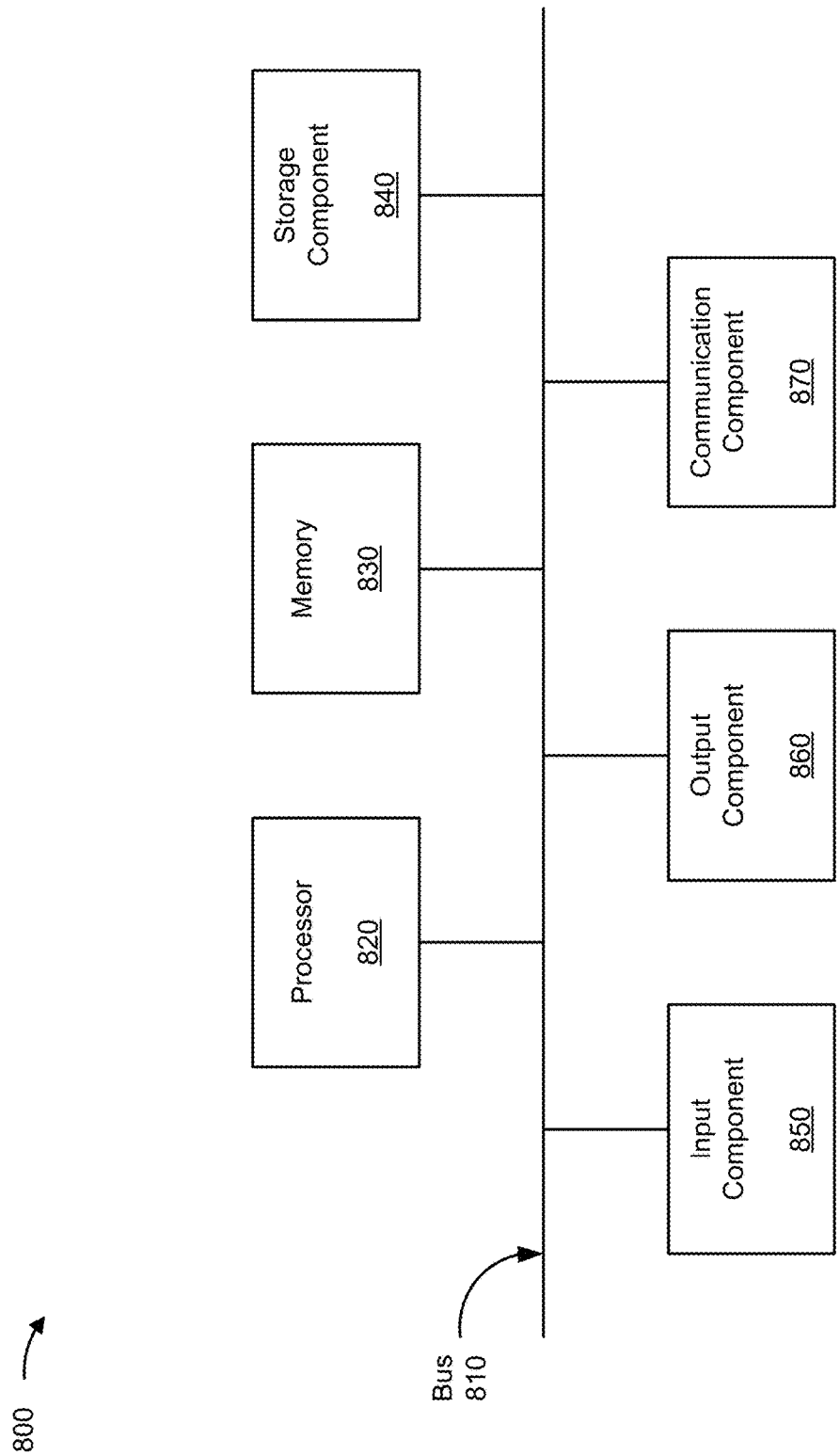
FIG. 8 is a diagram of example components of one or more devices of FIG. 2.

FIG. 8 is a diagram of example components of a device 800, which may correspond to document management system 701, user device 730, and/or data management system 740. In some implementations, document management system 701, user device 730, and/or data management system 740 may include one or more devices 800 and/or one or more components of device 800. As shown in FIG. 8, device 800 may include a bus 810, a processor 820, a memory 830, a storage component 840, an input component 850, an output component 860, and a communication component 870.

Bus 810 includes a component that enables wired and/or wireless communication among the components of device 800. Processor 820 includes a central processing unit, a graphics processing unit, a microprocessor, a controller, a microcontroller, a digital signal processor, a field-programmable gate array, an application-specific integrated circuit, and/or another type of processing component. Processor 820 is implemented in hardware, firmware, or a combination of hardware and software. In some implementations, processor 820 includes one or more processors capable of being programmed to perform a function. Memory 830 includes a random access memory, a read only memory, and/or another type of memory (e.g., a flash memory, a magnetic memory, and/or an optical memory).

Storage component 840 stores information and/or software related to the operation of device 800. For example, storage component 840 may include a hard disk drive, a magnetic disk drive, an optical disk drive, a solid state disk drive, a compact disc, a digital versatile disc, and/or another type of non-transitory computer-readable medium. Input component 850 enables device 800 to receive input, such as user input and/or sensed inputs. For example, input component 850 may include a touch screen, a keyboard, a keypad, a mouse, a button, a microphone, a switch, a sensor, a global positioning system component, an accelerometer, a gyroscope, and/or an actuator. Output component 860 enables device 800 to provide output, such as via a display, a speaker, and/or one or more light-emitting diodes. Communication component 870 enables device 800 to communicate with other devices, such as via a wired connection and/or a wireless connection. For example, communication component 870 may include a receiver, a transmitter, a transceiver, a modem, a network interface card, and/or an antenna.

Device 800 may perform one or more processes described herein. For example, a non-transitory computer-readable medium (e.g., memory 830 and/or storage component 840) may store a set of instructions (e.g., one or more instructions, code, software code, and/or program code) for execution by processor 820. Processor 820 may execute the set of instructions to perform one or more processes described herein. In some implementations, execution of the set of instructions, by one or more processors 820, causes the one or more processors 820 and/or the device 800 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 8 are provided as an example. Device 800 may include additional components, fewer components, different components, or differently arranged components than those shown in FIG. 8. Additionally, or alternatively, a set of components (e.g., one or more components) of device 800 may perform one or more functions described as being performed by another set of components of device 800.

Figure 9:
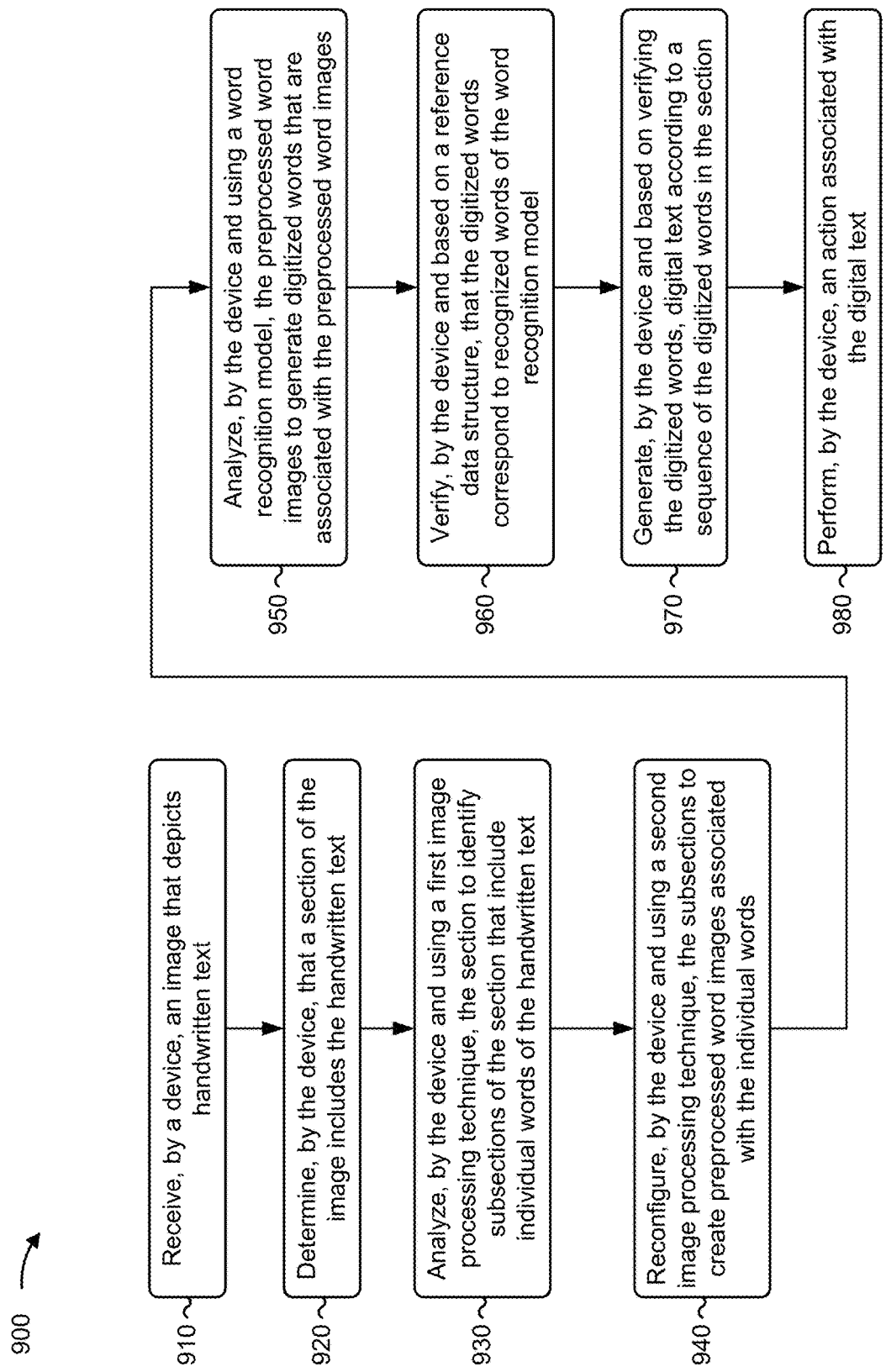
FIG. 9 is a flowchart of an example process relating to utilizing machine learning and image filtering techniques to detect and analyze handwritten text.

FIG. 9 is a flowchart of an example process 900 associated with utilizing machine learning and image filtering techniques to detect and analyze handwritten text. In some implementations, one or more process blocks of FIG. 9 may be performed by one or more devices that may implement a document management system (e.g., document management system 701). In some implementations, one or more process blocks of FIG. 9 may be performed by another device or a group of devices separate from or including the device, such as a data management system (e.g., data management system 740) and/or a user device (e.g., user device 730). Additionally, or alternatively, one or more process blocks of FIG. 9 may be performed by one or more components of device 800, such as processor 820, memory 830, storage component 840, input component 850, output component 860, and/or communication component 870.

As shown in FIG. 9, process 900 may include receiving an image that depicts handwritten text (block 910). For example, the device may receive an image that depicts handwritten text, as described above.

As further shown in FIG. 9, process 900 may include determining that a section of the image includes the handwritten text (block 920). For example, the device may determine that a section of the image includes the handwritten text, as described above.

As further shown in FIG. 9, process 900 may include analyzing, using a first image processing technique, the section to identify subsections of the section that include individual words of the handwritten text (block 930). For example, the device may analyze, using a first image processing technique, the section to identify subsections of the section that include individual words of the handwritten text, as described above.

As further shown in FIG. 9, process 900 may include reconfiguring, using a second image processing technique, the subsections to create preprocessed word images associated with the individual words (block 940). For example, the device may reconfigure, using a second image processing technique, the subsections to create preprocessed word images associated with the individual words, as described above.

As further shown in FIG. 9, process 900 may include analyzing, using a word recognition model, the preprocessed word images to generate digitized words that are associated with the preprocessed word images (block 950). For example, the device may analyze, using a word recognition model, the preprocessed word images to generate digitized words that are associated with the preprocessed word images, as described above.

As further shown in FIG. 9, process 900 may include verifying, based on a reference data structure, that the digitized words correspond to recognized words of the word recognition model (block 960). For example, the device may verify, based on a reference data structure, that the digitized words correspond to recognized words of the word recognition model, as described above.

As further shown in FIG. 9, process 900 may include generating, based on verifying the digitized words, digital text according to a sequence of the digitized words in the section (block 970). For example, the device may generate, based on verifying the digitized words, digital text according to a sequence of the digitized words in the section, as described above.

As further shown in FIG. 9, process 900 may include performing an action associated with the digital text (block 980). For example, the device may perform an action associated with the digital text, as described above.

Process 900 may include additional implementations, such as any single implementation or any combination of implementations described below and/or in connection with one or more other processes described elsewhere herein.

In a first implementation, determining that the section includes the handwritten text comprises classifying, based on a neural network, sections of the image that include text, wherein the neural network is trained to distinguish between printed-type text and handwritten-type text based on historical images that include historical configurations of printed-type text and historical configurations of handwritten-type text, and identifying, based on a classification by the neural network, that the section includes the handwritten-type text.

In a second implementation, alone or in combination with the first implementation, the first image processing technique comprises a binary filtering technique to denoise the section to form a denoised section, a dilation technique to enhance the denoised section to form an enhanced section, and a segmentation technique to identify the subsections according to a plurality of bounding boxes, wherein the individual words are identified within corresponding individual bounding boxes of the plurality of bounding boxes.

In a third implementation, alone or in combination with one or more of the first and second implementations, the first image processing technique further comprises a sequencing technique to determine the sequence of the digitized words according to an arrangement of the bounding boxes in the section.

In a fourth implementation, alone or in combination with one or more of the first through third implementations, the second image processing technique comprises a normalizing technique to form normalized subsections, from the subsections, based on one or more sizes of the subsections, a binary filtering technique to denoise the normalized subsections to form denoised subsections, and a dilation technique to enhance the denoised subsections to form enhanced subsections, wherein the preprocessed word images are created from corresponding content of the enhanced subsections.

In a fifth implementation, alone or in combination with one or more of the first through fourth implementations, the second image processing technique further comprises a masking technique to remove non-text indicators from the enhanced subsections to form masked subsections, wherein the preprocessed word images are created from corresponding masked content of the masked subsections.

In a sixth implementation, alone or in combination with one or more of the first through fifth implementations, performing the action comprises at least one of storing the digital text in a data structure associated with a search engine to permit the digital text to be retrieved in association with a search query, providing the digital text to a data management system, performing an analysis of the digital text relative to data maintained by the data management system, generating a report based on the analysis of the digital text relative to the data, or providing the report to a user device associated with the data management system.

Although FIG. 9 shows example blocks of process 900, in some implementations, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:

receiving, by a device, an image that depicts handwritten text;

determining, by the device, that a section of the image includes the handwritten text;

analyzing, by the device and using a first image processing technique, the section to identify subsections of the section that include individual words of the handwritten text;

reconfiguring, by the device and using a second image processing technique, the subsections to create preprocessed word images associated with the individual words;

analyzing, by the device and using a word recognition model, the preprocessed word images to generate digitized words that are associated with the preprocessed word images;

verifying, by the device and based on a reference data structure, that the digitized words correspond to recognized words of the word recognition model;

generating, by the device and based on verifying the digitized words, digital text according to a sequence of the digitized words in the section; and performing, by the device, an action associated with the digital text.

2. The method of claim 1, wherein determining that the section includes the handwritten text comprises:

classifying, based on a neural network, sections of the image that include text, wherein the neural network is trained to distinguish between printed-type text and handwritten-type text based on historical images that include historical configurations of printed-type text and historical configurations of handwritten-type text; and identifying, based on a classification by the neural network, that the section includes the handwritten-type text.

3. The method of claim 1, wherein the first image processing technique comprises:

a binary filtering technique to denoise the section to form a denoised section;

a dilation technique to enhance the denoised section to form an enhanced section; and a segmentation technique to identify the subsections according to a plurality of bounding boxes, wherein the individual words are identified within corresponding individual bounding boxes of the plurality of bounding boxes.

4. The method of claim 3, wherein the first image processing technique further comprises:

a sequencing technique to determine the sequence of the digitized words according to an arrangement of the bounding boxes in the section.

5. The method of claim 1, wherein the second image processing technique comprises:

a normalizing technique to form normalized subsections, from the subsections, based on one or more sizes of the subsections;

a binary filtering technique to denoise the normalized subsections to form denoised subsections; and a dilation technique to enhance the denoised subsections to form enhanced subsections, wherein the preprocessed word images are created from corresponding content of the enhanced subsections.

6. The method of claim 5, wherein the second image processing technique further comprises:

a masking technique to remove non-text indicators from the enhanced subsections to form masked subsections, wherein the preprocessed word images are created from corresponding masked content of the masked subsections.

7. The method of claim 1, wherein performing the action comprises at least one of:
storing the digital text in a data structure associated with a search engine to permit the digital text to be retrieved in association with a search query;
providing the digital text to a data management system;
perform an analysis of the digital text relative to data maintained by the data management system;
generate a report based on the analysis of the digital text relative to the data; or
provide the report to a user device associated with the data management system.

8. A device, comprising:
one or more memories; and
one or more processors, communicatively coupled to the one or more memories, configured to:
receive an image that depicts handwritten text;
determine that a section of the image includes the handwritten text;
analyze, using a first image processing technique, the section to identify subsections of the section that include individual words of the handwritten text;
reconfigure, using a second image processing technique, the subsections to create preprocessed word images of the individual words;
convert, using a word recognition model, the preprocessed word images to digital text that is associated with the preprocessed word images; and
store the digital text in a data structure of a data management system.

9. The device of claim 8, wherein the one or more processors, when determining that the section, are configured to the handwritten text comprises:
classify, according to a neural network, sections of the image that include text based on whether the sections include printed-type text or handwritten-type text; and
identify, based on a classification of the section by the neural network, that the section includes the handwritten text.

10. The device of claim 8, wherein the one or more processors, when analyzing the section to identify the subsections, are configured to, according to the first image processing technique:
perform a binary filtering technique to denoise the section to form a denoised section;
perform a dilation technique to enhance the denoised section to form an enhanced section; and
perform a segmentation technique to identify the subsections according to a plurality of bounding boxes,
wherein the individual words are identified within corresponding individual bounding boxes of the plurality of bounding boxes.

11. The device of claim 8, wherein the one or more processors, when reconfiguring the subsections, are configured to, according to the second image processing technique:
perform a normalizing technique to form normalized subsections based on one or more sizes of the subsections;
perform a binary filtering technique to denoise the normalized subsections to form denoised subsections; and
perform a dilation technique to enhance the denoised subsections to form enhanced subsections,
wherein the preprocessed word images are created from corresponding content of the enhanced subsections.

12. The device of claim 8, wherein the word recognition model comprises:
a convolutional neural network to identify corresponding sets of features of the preprocessed word images; and
a recurrent neural network to sequence the corresponding sets of features to generate corresponding digitized words of the digital text.

13. The device of claim 12, wherein the convolutional neural network is a multi-layered convolutional neural network and the recurrent neural network is a multi-layered neural network.

14. The device of claim 8, wherein the one or more processors are further configured to:
perform an analysis of the digital text relative to data of the data structure;
generate a report based on the analysis of the digital text relative to the data; and
provide the report to a user device associated with the data management system.

15. A non-transitory computer-readable medium storing a set of instructions, the set of instructions comprising:
one or more instructions that, when executed by one or more processors of a device, cause the device to:
receive an image that depicts handwritten text;
determine that a section of the image includes a portion of the handwritten text;
analyze the section to identify a subsection of the section that is associated with individual word of the portion of the handwritten text;
reconfigure the subsection to create a preprocessed word image of the individual word;
convert, using a machine learning model, the preprocessed word image to a digital word that is associated with the preprocessed word image;
determine, based on a sequence of subsections of the section, a sequence identifier of the digital word;
generate, based on the sequence identifier and the digital word, digital text associated with the image; and
perform an action associated with the digital text.

16. The non-transitory computer-readable medium of claim 15, wherein the one or more instructions, that cause the device to analyze the section to identify the subsection, cause the device to:
perform a binary filtering technique to denoise the section to form a denoised section;
perform a dilation technique to enhance the denoised section to form an enhanced section; and
perform a segmentation technique to identify the subsection according to a bounding box associated with the individual word.

17. The non-transitory computer-readable medium of claim 15, wherein the one or more instructions, that cause the device to reconfigure the subsection, cause the device to:
perform a normalizing technique to form a normalized subsection, from the subsection, based on one or more sizes of other subsections that are associated with other individual words of the subsection;
perform a binary filtering technique to denoise the normalized subsection to form a denoised subsection; and
perform a dilation technique to enhance the denoised subsection to form an enhanced subsection,
wherein the preprocessed word image is created from content of the enhanced subsection.

18. The non-transitory computer-readable medium of claim 15, wherein the machine learning model comprises at least one of:
- a convolutional neural network to identify corresponding sets of features of the preprocessed word images; and
- a recurrent neural network to sequence the corresponding sets of features to generate corresponding digitized words of the digital text.

19. The non-transitory computer-readable medium of claim 18, wherein the recurrent neural network comprises a long-short term memory model.

20. The non-transitory computer-readable medium of claim 15, wherein the one or more instructions, that cause the device to perform the action, cause the device to:
- store the digital text in a data structure associated with a search engine to permit the digital text to be retrieved in association with a search query;
- provide the digital text to a data management system;
- perform an analysis of the digital text relative to data maintained by the data management system;
- generate a report based on the analysis of the digital text relative to the data; or
- provide the report to a user device associated with the data management system.

* * * * *